US 9,947,449 B2

(12) United States Patent
Fruth et al.

(10) Patent No.: US 9,947,449 B2
(45) Date of Patent: Apr. 17, 2018

(54) ELECTROMAGNETIC ACTUATOR, VALVE, AND INJECTION PUMP

(71) Applicant: Continental Automotive GmbH, Hannover (DE)

(72) Inventors: Reinhard Fruth, Velburg-Guenching (DE); Xaver Gebhardt, Regensburg (DE); Bernd Woellisch, Cham (DE); Christian Henfling, Regensburg (DE); Rainer Weber, Regensburg (DE); Matthias Bleeck, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 111 days.

(21) Appl. No.: 14/423,372

(22) PCT Filed: Aug. 22, 2013

(86) PCT No.: PCT/EP2013/067476
§ 371 (c)(1),
(2) Date: Feb. 23, 2015

(87) PCT Pub. No.: WO2014/029850
PCT Pub. Date: Feb. 27, 2014

(65) Prior Publication Data
US 2015/0226168 A1    Aug. 13, 2015

(30) Foreign Application Priority Data

Aug. 22, 2012   (DE) .................. 10 2012 214 920

(51) Int. Cl.
*H01F 7/08*      (2006.01)
*F16K 31/06*     (2006.01)
*F02M 63/00*     (2006.01)

(52) U.S. Cl.
CPC ........... *H01F 7/088* (2013.01); *F02M 63/007* (2013.01); *F02M 63/0017* (2013.01);
(Continued)

(58) Field of Classification Search
CPC ............. F02M 63/007; F02M 63/0017; F02M 63/0021; F02M 63/0022; F02M 63/0015;
(Continued)

(56) References Cited

U.S. PATENT DOCUMENTS 4,643,223 A * 2/1987 Abe .................. F02M 59/466
137/375
4,646,976 A * 3/1987 Rembold ............ F02M 59/366
239/585.3

(Continued)

FOREIGN PATENT DOCUMENTS

CN    101641514 A    2/2010    ............ F02M 55/02
CN    102037236 A    4/2011    ............ F02M 51/06
(Continued)

OTHER PUBLICATIONS

Chinese Office Action, Application No. 201380044498.5, 13 pages, dated Sep. 1, 2016.
(Continued)

Primary Examiner — Reinaldo Sanchez-Medina
Assistant Examiner — David Colon Morales
(74) Attorney, Agent, or Firm — Slayden Grubert Beard PLLC

(57) ABSTRACT

An electromagnetic actuator includes an electromagnet having a coil, which coil surrounds a pole core, and a magnet armature, which can be moved toward the pole core by the electromagnet, wherein the magnet armature has a bearing surface facing the pole core and the pole core has a correspondingly opposite counter surface. The bearing surface and/or the counter bearing surface has a layer that prevents
(Continued)

direct contact of the bearing surface with the counter bearing surface and that causes damping of the approaching movement.

10 Claims, 4 Drawing Sheets

(52) U.S. Cl.
CPC ..... *F02M 63/0021* (2013.01); *F16K 31/0696* (2013.01); *H01F 7/081* (2013.01); *F02M 2200/07* (2013.01); *F02M 2200/304* (2013.01); *H01F 2007/086* (2013.01)

(58) Field of Classification Search
CPC ............ F02M 63/0031; F02M 59/367; F02M 59/366; F02M 59/365; F02M 2200/07; F02M 2200/304; H01F 7/081; H01F 7/088; H01F 2007/086; F16K 31/0696
USPC ........................................ 251/129.15, 129.19
See application file for complete search history.

(56) References Cited

U.S. PATENT DOCUMENTS

| | | | | |
|---|---|---|---|---|
| 5,265,703 | A * | 11/1993 | Ackermann | F16F 9/461 137/487.5 |
| 5,326,070 | A * | 7/1994 | Baron | F16K 31/0696 251/129.05 |
| 5,350,153 | A * | 9/1994 | Morinigo | F01L 9/04 251/129.1 |
| 5,918,818 | A * | 7/1999 | Takeda | F02M 51/061 239/585.1 |
| 5,992,821 | A * | 11/1999 | Rookes | F02M 59/466 251/129.1 |
| 6,022,086 | A * | 2/2000 | Braum | B60T 8/365 303/119.1 |
| 6,161,813 | A * | 12/2000 | Baumgartner | F02M 47/027 251/129.16 |
| 6,279,524 | B1 * | 8/2001 | Schebitz | H01F 7/088 123/90.11 |
| 6,281,772 | B1 * | 8/2001 | Adams | H01F 7/088 251/129.16 |
| 6,345,608 | B1 * | 2/2002 | Rembold | F02M 59/34 123/456 |
| 6,513,497 | B1 | 2/2003 | Mahr et al. | 123/447 |
| 6,764,061 | B2 | 7/2004 | Haeberer et al. | 251/129.16 |
| 6,848,669 | B2 * | 2/2005 | Makino | F02M 63/0019 251/129.15 |
| 6,913,242 | B2 * | 7/2005 | Reichert | H01F 7/088 251/129.18 |
| 7,221,248 | B2 * | 5/2007 | Mitteer | H01F 7/088 335/220 |
| 7,354,027 | B2 | 4/2008 | Mennicken et al. | 251/64 |
| 7,422,193 | B2 * | 9/2008 | Sisk | F16K 31/0655 251/129.15 |
| 7,819,637 | B2 * | 10/2010 | Oda | F02M 59/366 251/129.07 |
| 7,828,265 | B2 * | 11/2010 | Sisk | F16K 31/0655 251/129.19 |
| 7,946,276 | B2 * | 5/2011 | Pusch | F02M 61/166 123/472 |
| 7,963,270 | B2 * | 6/2011 | Ricco | F02M 47/027 123/472 |
| 2004/0155212 | A1 * | 8/2004 | Hess | F01P 7/14 251/64 |
| 2004/0223856 | A1 * | 11/2004 | Rembold | F02M 59/366 417/222.2 |
| 2004/0251738 | A1 * | 12/2004 | Kawa | B60T 8/363 303/119.2 |
| 2006/0113503 | A1 | 6/2006 | Mennicken et al. | 251/129.15 |
| 2007/0158603 | A1 * | 7/2007 | Vollmer | F16K 31/0655 251/50 |
| 2008/0073605 | A1 * | 3/2008 | Ishigaki | F16K 1/36 251/12 |
| 2010/0111734 | A1 * | 5/2010 | Usui | F02M 59/366 417/505 |
| 2011/0220740 | A1 | 9/2011 | Moser et al. | 239/570 |
| 2013/0327970 | A1 | 12/2013 | Pilgram | 251/129.15 |

FOREIGN PATENT DOCUMENTS

| | | | | |
|---|---|---|---|---|
| CN | 102084165 | A | 6/2011 | ............ F16K 31/06 |
| DE | 19939429 | A1 | 3/2001 | ............ F02M 45/00 |
| DE | 10305985 | A1 | 7/2004 | ............ F02M 51/06 |
| DE | 102004059974 | A1 | 6/2006 | ............ B05B 1/08 |
| DE | 102007028960 | A1 * | 12/2008 | ........... F02M 59/102 |
| DE | 102007034038 | A1 * | 1/2009 | ......... F02M 63/0017 |
| DE | 102009001706 | A1 | 9/2010 | ............ F02M 47/02 |
| DE | 102010064105 | A1 | 1/2012 | ............ F02M 25/08 |
| EP | 1270930 | A1 | 1/2003 | ............ F02M 47/00 |
| GB | 2065833 | A | 7/1981 | ............ F02M 51/06 |
| JP | 2006509964 | A | 3/2006 | ............ F02M 51/06 |
| WO | 2004/055357 | A1 | 7/2004 | ............ F02M 51/06 |
| WO | WO 2004074673 | A1 * | 9/2004 | ......... F02M 51/0671 |
| WO | 2013/098249 | A1 | 7/2013 | ............ F02M 59/36 |
| WO | 2014/029850 | A1 | 2/2014 | ............ F02M 63/00 |

OTHER PUBLICATIONS

International Search Report and Written Opinion, Application No. PCT/EP2013/067476, 15 pages, dated Oct. 28, 2013.

* cited by examiner

ELECTROMAGNETIC ACTUATOR, VALVE, AND INJECTION PUMP

CROSS-REFERENCE TO RELATED APPLICATIONS

This application is a U.S. National Stage Application of International Application No. PCT/EP2013/067476 filed Aug. 22, 2013, which designates the United States of America, and claims priority to DE Application No. 10 2012 214 920.1 filed Aug. 22, 2012, the contents of which are hereby incorporated by reference in their entirety.

TECHNICAL FIELD

The invention relates to an electromagnetic actuator, to a valve having an actuator of said type, in particular an inlet valve for a fuel injection pump, and to an injection pump having a valve of said type.

BACKGROUND

An electromagnetic actuator and a valve within a fuel injection pump are known in particular from the international laid-open specification WO 2013098249 A1.

In the case of generic electromagnetic actuators and valves, those faces of magnet armature and pole core of the electromagnetic actuator which face one another impact against one another during the actuation of the valve. This not only generates loud operating noises but can, in particular in the case of valves with fast closing speeds, have the effect that the surfaces impacting against one another are damaged. As a consequence, under some circumstances, the service life or the usage life of the valves is limited, and the valves must be checked or exchanged at relatively short intervals. In the case of magnetic valves, it is sought in the prior art to counteract this problem through optimization of the actuation of the magnet.

SUMMARY

One embodiment provides an electromagnetic actuator, comprising: an electromagnet comprising a coil that surrounds a pole core, a magnet armature configured for an approach movement toward the pole core by the electromagnet, wherein the magnet armature has a support face facing toward the pole core, and the pole core has a counterpart face facing toward the support face of the magnet armature, wherein at least one of the support face and the counterpart support face has a layer that prevents direct contact between that face and the other one of the support face and the counterpart support face, wherein the layer dampens the approach movement of the magnet armature toward the pole core.

In a further embodiment, the layer is adhesively bonded or welded to at least one of the support face and the counterpart support face.

In a further embodiment, the layer has a uniform thickness.

In a further embodiment, the layer is at least partially inserted into a depression formed in a surface of the support face or the counterpart support face and fastened in the depression by adhesive or positive locking, wherein at least a part of the layer protrudes beyond a top side of the support face or counterpart support face in a direction of the counterpart support face or support face respectively.

In a further embodiment, the layer comprises a plurality of webs and free spaces between adjacent pairs of webs.

In a further embodiment, the free spaces between the webs are formed such that air present in each free space builds up in at least one subregion of that free space during the approach movement of the support face and the counterpart support face, thereby pneumatically damping the approach movement.

In a further embodiment, the layer comprises a metal, a composite material, or a plastic.

Another embodiment provides a valve, comprising a spring having a spring force, an electromagnetic actuator as disclosed above and which provides an actuator force acting counter to the spring force, a valve member actuated by the actuator, a sealing element configured for coupling to the valve member, and a sealing seat that bears against the sealing seat when the valve is closed, wherein the valve member is either (a) arranged relative to the actuator and the spring such that the valve is openable by the actuator force counter to the spring force or (b) arranged such that the valve is closable by the actuator force counter to the spring force when the actuator is activated.

BRIEF DESCRIPTION OF THE DRAWINGS

Example embodiments of the invention are discussed below with reference to the drawings, in which.

DETAILED DESCRIPTION

Figure 1:
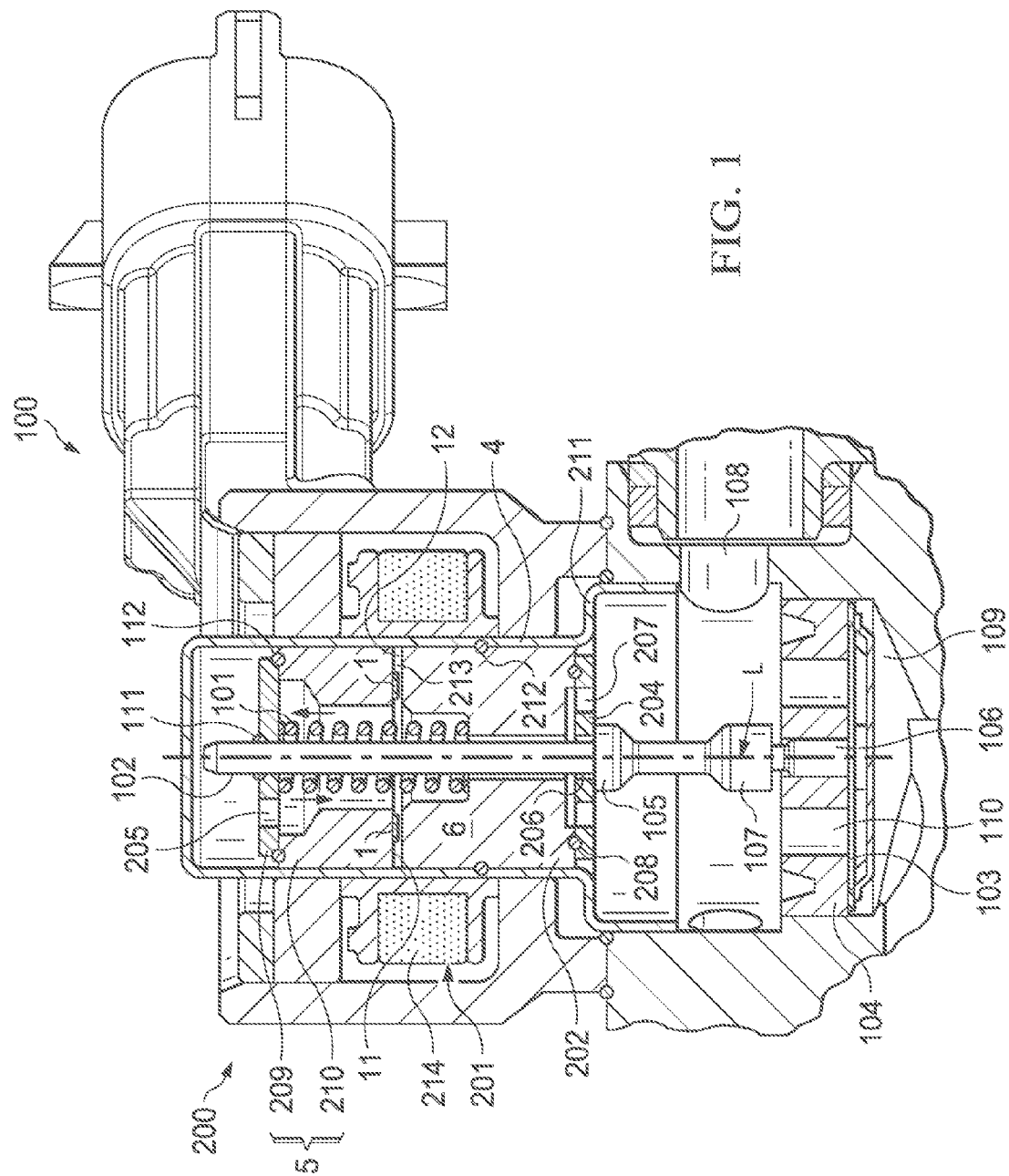
FIG. 1 shows an actuator according to a first aspect of the invention within a valve according to a second aspect of the invention.

Some embodiments provide an electromagnetic actuator with low noise emissions and a longer usage life than known valves, which electromagnetic actuator can at the same time be produced inexpensively. It is also an object to provide a valve having an actuator of said type, and an injection pump having a valve of said type.

According to a first embodiment, the electromagnetic actuator comprises in particular an electromagnet, comprising a coil which surrounds a pole core and a (magnet) armature which can be moved in the direction of the pole core by means of the electromagnet, wherein the magnet armature has a support face facing toward the pole core, and the pole core has a correspondingly facing counterpart face.

The support face and/or the counterpart support face have/has a layer which prevents direct contact between the support face and the counterpart support face and which effects damping of the approach movement.

The layer may for example be composed of a metal, of a composite material, for example with carbon fibers, or of a plastic. The expression "plastic" also encompasses lacquers, resins, paints etc., with and without added solid particles, which may for example be sprayed or printed onto the support face and/or counterpart support face. The layer may also be formed from multiple layers or components composed of different materials. Said layer may at least partially be formed from and/or comprise an elastically deformable material.

The layer is composed of a material and has a form such that the closing movement of the valve is at least hydraulically, in particular pneumatically, dampened by the layer. At the same time, it is also possible in this way for the noises that are generated for example when the counterpart support face impacts against the support face to be dampened in an effective manner, which leads to a reduction in valve noises. Since the layer dampens the momentum of the mechanical impact of the counterpart support face against the support face, it can be achieved that less mechanical damage is caused to the valve, which can lead to a cost-saving longer usage life of the valve.

The damping layer is fixedly connected, for example laid, adhesively bonded or welded onto, the support face and/or the counterpart support face. The damping layer preferably has a uniform thickness over its entire extent. If a damping layer is formed on the support face and on the counterpart support face, said damping layers are preferably arranged such that, at the point of closest approach, they do not overlap.

It is however also possible for the support face and/or the counterpart support face to have recesses in the surface, into which the damping layer is at least partially inserted and held for example by positive locking or adhesion, wherein, in the region of the recesses, the damping layer may have a thickness which is greater than the depth of the recess(es), such that the damping layer protrudes beyond a top side of the support face and/or counterpart support face.

A geometry or form of the damping layer may be freely selected and may be adapted to the requirements, for example the desired damping characteristics and/or desired stiffness, of the valve based on its use. For example, the geometry may be selected such that the form of the damping layer assists an outflow of the medium flowing through the valve during the closure of the valve. At the same time, it is possible, by means of the predefined geometry, for the outflow of the medium to effect hydraulic damping of the closing movement.

For this purpose, the damping layer may for example have webs and free spaces between in each case two adjacent webs. The webs and free spaces of the damping layer may have identical or different forms; it is preferable for all of the webs and all of the free spaces of a damping layer to be of identical form. The free spaces may be formed such that the medium which is held in the free spaces can, as it flows out of the free spaces, be compressed and/or accelerated owing to the approach movement of the support and counterpart support faces. For example, the free spaces may be of pocket-like form, with a constriction in the direction of the outlet through which the medium must be displaced. In this way, the desired hydraulic damping arises owing to the build-up of the medium at and close to the constriction, which can permit a compression of the medium in said region. In the constriction, an acceleration of the medium in the direction of the outlet occurs at the same time, thus assisting the complete outflow of the medium out of the free spaces.

The damping layer may have a closed or a structured surface, for example a multiplicity of studs, in the region of the webs. The surface may also be of undulating or toothed form. If the surface of the damping layer does not have a closed surface, then the geometry of the surface is preferably selected such that material present in the surface structure, in particular air, is displaced into the free spaces as the support face and counterpart face approach one another.

The free spaces between the webs may be free from the material of the damping layer, that is to say no damping layer is situated on the support face and/or counterpart support face in that region. Alternatively, the damping layer may have free spaces which are formed in the damping layer merely as depressions, such that the damping layer comprises a base surface which is as large as the sum of the webs and free spaces. Said large base surface then forms the support and connecting face of the damping layer with respect to the surface of the support face and/or counterpart support face. The base of the free spaces may in this case run parallel to the surface of the damping layer, such that the free space has the same depth over its entire extent. The base may however also be inclined at least in regions, with a smallest depth at the housing-side end of the free space and a maximum depth at the opposite end in the middle of the valve. Other embodiments of the free spaces are also conceivable, for example a base with an additional incline component perpendicular to a longitudinal axis of the free space, a stepped base, etc.

That is to say, mechanical damping characteristics of the actuator can be set by means of the geometry of the webs, which substantially form the effective damping layer when the support and counterpart support faces are at a point of close approach. Parameters of the geometry of the webs may for example be the thickness and the form of the webs. The hydraulic or pneumatic damping characteristics of the actuator can be set by means of the geometry of the free spaces. Parameters of the free spaces may for example be the depth and the form of the free spaces.

According to another embodiment, a valve comprises a spring with a spring force, an actuator according to the first aspect with an actuator force which can act counter to the spring force, a valve member which can be actuated by means of the actuator, a sealing element which can be coupled to the valve member, and a sealing seat which is such that the valve is closed when the sealing element bears against the sealing seat.

The valve member is either, in accordance with a first variant, arranged with respect to the actuator and the spring such that the valve can be opened by means of the actuator force counter to the spring force or, in accordance with a second variant, arranged such that the valve can be opened by means of the actuator force counter to the spring force when the actuator is activated. The first variant is also referred to as the currentlessly closed variant; such a variant is presented for example in WO 2013098249 A1. The second variant is correspondingly referred to as the currentlessly open variant. By contrast to the currentlessly closed variant, the arrangement of the magnet armature is in this case interchanged with that of the pole core with regard to the movement direction of the valve member.

FIG. 1 shows a valve 100. The valve 100 is in particular an inlet valve of a pump. The pump is in particular in the form of a high-pressure pump, preferably in the form of a radial piston pump. A pump piston is movably mounted in the pump. A pressure chamber is situated at one end of the pump piston. To be able to fill the pressure chamber with fluid, said pressure chamber has a feed line in which the valve 100 in the form of an inlet valve is preferably arranged. The valve 100 is preferably in the form of a digitally switched valve. The valve 100 facilitates the filling of the pressure chamber and is designed such that, during the ejection of the fluid, it prevents a backflow of the fluid into the feed line when the valve 100 is closed. Fluid may for example be discharged from the pressure chamber via a discharge line.

The valve 100 has a spring 101, a pin 102 and a sealing element 103. The spring 101 preloads the pin 102 in a direction away from the sealing element 103 by virtue of the spring 101 being supported on a pole core 6 of an actuator 200 of the valve 100. The spring 101 is supported by way of its second end on a magnet armature element 209. The magnet armature element 209 is, together with a further magnet armature element 210, part of a magnet armature 5.

The pin 102 is of elongate form and runs along a longitudinal axis L through the pole core 6. On one side of the pole core 6, the pin 102 is coupled to the magnet armature element 209. In particular, the magnet armature element 209 is coupled to the pin 102 by means of a welded connection 111. On that side of the pole core 6 which is situated opposite along the longitudinal axis, the pin 102 has a projecting region 105. The pin 102 has a further projecting region 107 which faces toward a sealing seat 104 of the valve 100.

The actuator 200 comprises an electromagnet 201. The electromagnet 201 comprises a coil 214 which is in particular arranged annularly around the pole core 6. The coil 214 coaxially surrounds the longitudinal axis L. The magnet armature 5, the pole core 6 and the sealing seat 104 are arranged in series along the longitudinal axis L. The sealing element 103 is arranged on a side of the sealing seat 104 which faces away from the actuator 200. The sealing seat 104 surrounds at least one passage recess 110. Fluid can flow via the passage recess 110 when the sealing element 103 is not bearing against the sealing seat 104. In particular, fluid can flow through the passage recesses 110 from a fluid inlet 108 into a fluid outlet 109.

If current or voltage is applied to the electromagnet 201, in particular to the coil 214, it exerts a magnetic force on the magnet armature 5 in the direction of the sealing element 103. Said actuator force Fa is transmitted to the pin 102, since the magnet armature element 209 and the further magnet armature element 210 are coupled so as to be immovable relative to one another by means of a welded connection 112, and the magnet armature 5 and the pin 102 are coupled so as to be immovable relative to one another by means of the welded connection 111. Thus, the pin 102 is moved in the direction of the sealing element 103 by the actuator force Fa. The pin 102 is coupled to the sealing element 103 and, during the further course of the movement, pushes the latter away from the sealing seat 104. The valve is thus opened.

The valve 100 opens even without the pin 102 being moved, or without the pin 102 and the sealing element 103 coming into contact with one another, merely owing to a pressure difference between the upstream and downstream sides of the sealing element 103. The sealing element 103 lifts from the sealing seat 104 when the pressure on the side of the inlet 108 is higher than that on the side of the outlet 109.

The valve can thus be opened in two ways. The valve can be forcibly opened, or held opened counter to a pressure from the outlet 109, by the actuator. The valve 100 can however also open passively, without having to be electrically actuated, when the pump is in the suction phase and performs its suction stroke and draws fluid into the pressure chamber.

In a rest position, when the actuator 200 is not energized, the spring 101 pushes the pin 102 in a direction away from the sealing element 103. A spring force Ff of the spring 101 holds the pin 102 such that the sealing element 103 can bear against the sealing seat 104. The spring force Ff and the actuator force Fa are directed oppositely to one another. The spring force Ff and the actuator force Fa are aligned in the same direction as the longitudinal axis L. To close the valve, the sealing element is pressed against the sealing seat 104 by the pressure conditions upstream and downstream of the sealing element, thus preventing a fluid flow out of the outlet 109 into the inlet 108.

Thus, in one operating state of the valve, the movement of the sealing element 103 relative to the sealing seat 104 is independent of a movement of the pin 102. By means of the pin 102, the opening of the valve 100 can be assisted and/or the valve 100 can be held in its open position even during a delivery stroke in a compression phase of the pump. Thus, a partial delivery action of the pump can be realized, by means of which a predefined fraction of the fluid that has been drawn in is delivered out of the pressure chamber back into the inlet 108. For this purpose, the sealing element 103 is held spaced apart from the sealing seat 104 by the pin 102. The actuator 200 exerts the actuator force Fa on the pin 102 such that the pin 102 can hold the sealing element 103 counter to the fluid pressure from the pressure chamber, and thus fluid can flow through the passage recesses 110 back into the inlet 108.

A full delivery action of the pump can be realized independently of the actuator 200. In the suction phase of the pump, the actuator 200 does not need to operate counter to a spring force which pushes the sealing element against the sealing seat. In the compression phase, the sealing element 103 assists the spring 101 during the closing process, since the sealing element 103 moves the pin 102. Thus, short closing times of the valve 101 can be realized. An air gap 213 between the further magnet armature element 210 and the pole core 6 is constant in the rest state.

When the electromagnet 201 is energized, the magnet armature 5 with the coupled pin 102 is pulled in the direction of the pole core 6. The pin 102 opens the sealing element 103. When the electromagnet 201 is deenergized, the magnet armature 5 with the pin 102 is pushed into the initial position by the spring 101. The inlet valve is thus unblocked.

A movement of the pin 102 in the direction away from the sealing element 103 is limited by a stop element 204. In particular, the projecting region 105 of the pin 102 impacts against the areal stop element 204. The pin 102 is decoupled from the resilient sealing element 103. The sealing element 103 is designed such that, when the electromagnet 201 is deactivated, no pressure is exerted on the sealing element 103 by the pin 102. The valve 100 can operate independently of the electromagnet 201 and the pin 102, and in particular independently of the electromagnet 201 in the suction phase. In the compression phase, the spring force of the sealing element acts in addition to the spring 101 in order to close the inlet valve.

The stop element 204 serves to limit the movement of the pin 102. When the projecting region 105 comes into contact with the stop element 204, a movement of the pin 102 further away from the sealing element 103 is no longer possible. In this way, a spacing 106 between the pin 102 and the sealing element 103 in the rest position is also predefined. The movement of the pin in the direction of the sealing element 103 is limited by the further projecting region 107 and the sealing seat 104. The stop element 204 has a recess 206 through which the pin 102 is guided. The stop element 204 is arranged on that side of the pole core 6 which faces away from the magnet armature 5. In particular, the stop element 204 is coupled to the pole core 6 by means of a welded connection 208. The stop element 204 is in particular a hardened disk which protects the relatively soft pole core 6.

In embodiments, the stop element 204 has at least one further recess 207. The latter is hydraulically coupled to the recess of the pole core 6, in which the pin 102 is guided through the pole core 6. Furthermore, the magnet armature element 209 has a magnet armature recess 204 which is hydraulically coupled to the recess of the pole core 6. Thus, that side of the magnet armature 203 which faces away from the sealing element 103 and that side of the stop element 204 which faces toward the sealing element 103 are hydraulically coupled to one another. Thus, pressure equalization is possible between the fluid-conducting region at the fluid inlet 108 and the region of the magnet armature 203.

Thus, a movement of the pin 102 owing to pressure differences is prevented.

The pole core 6 is coupled by means of a welded connection 212 to a housing 4 in which the magnet armature 5 and, in part, the pin 102 are also arranged. The housing 4 surrounds the pin 102, the magnet armature 5 and the pole core 6 in fluidically sealed fashion.

A movement of the pin 102 in the direction of the spring force Ff is limited by the stop element 204, and forces during the braking of the movement of the pin 102 are absorbed by the stop element 204. Furthermore, precise setting of the air gap 213 is possible through the limitation of the movement of the pin 102. Thus, a limitation of the movement of the pin 102 is realized by means of the stop element 204 even though the pin 102 is not fixedly coupled to the sealing element 103.

On the magnet armature 5, a layer 1 is fastened to or laid on a support face 11 of the magnet armature 5. The layer 1 could likewise be applied to a counterpart support face 12 of the pole core 6. Alternatively, it is possible for the layers 1 to be applied both to the support face 11 and to the counterpart support face 12.

Figure 2:
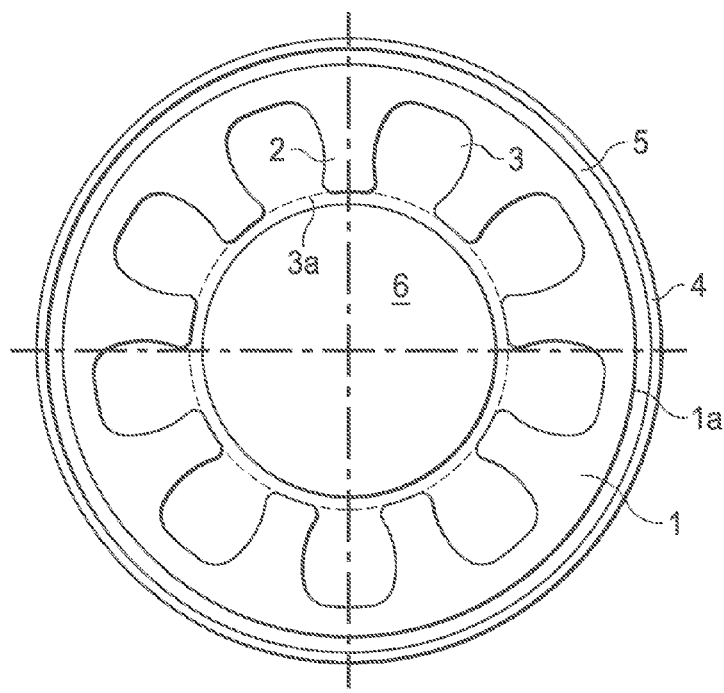
FIG. 2 shows a layer with a first example geometry.

FIG. 2 shows a plan view of a part of a magnetic valve having the (valve) housing 4, the magnet armature 5 and the pole core 6. A layer 1 is fastened to or laid on the magnet armature 5. The layer 1 has webs 2 and free spaces 3 between in each case two adjacent webs 2. The geometry of the free spaces 3 is determined by the form of the webs 2. In FIG. 2, the free spaces 3 have a form similar, for example, to that of the teeth of delivery pumps.

The layer 1 has a housing-side outer edge 1a which, in the exemplary embodiment shown, is circumferentially closed. The free spaces 3 are narrowed slightly at their pole core-side end 3a, which has the effect that, during a closing movement of the valve, the medium present in the free spaces 3 must be displaced through said constriction, whereby the closing movement of the valve is dampened.

At the same time, the webs 2 ensure that no direct mechanical contact occurs between that part of the magnetic valve which is shown and the counterpart which is not shown, which can additionally lead to noise deadening during the closing of the valve and prevents magnetic and/or hydraulic adhesion of the valve.

Figure 3:
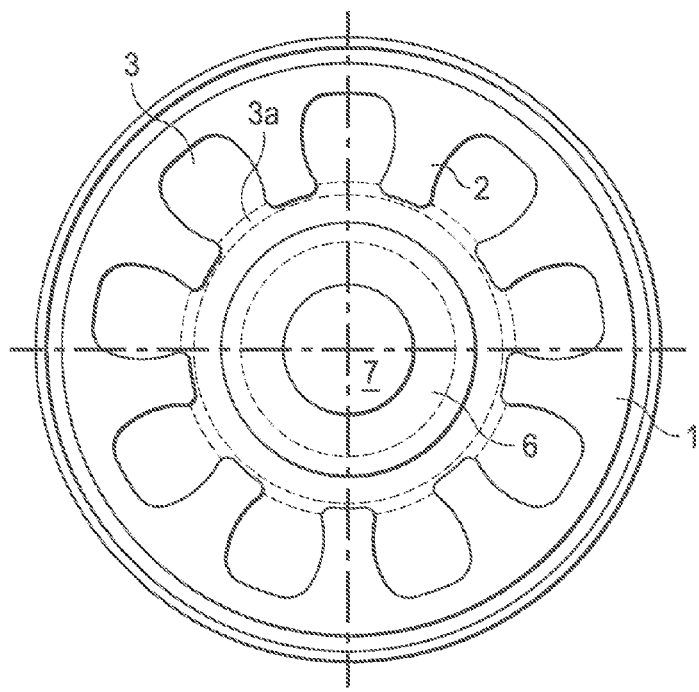
FIG. 3 shows a layer with a second example geometry.

FIG. 3 likewise shows a plan view of a part of a magnetic valve which has a pole core 6 and a spring receptacle 7 in which there is supported a spring (not shown) which can hold the deenergized valve in a closed position. At its inner end, the layer 1 has a greater spacing to the pole core 6 than the embodiment shown in FIG. 2. At the same time, the free spaces 3 have a narrower outlet 3a, such that the hydraulic damping action of both embodiments is approximately equal.

Figure 4:
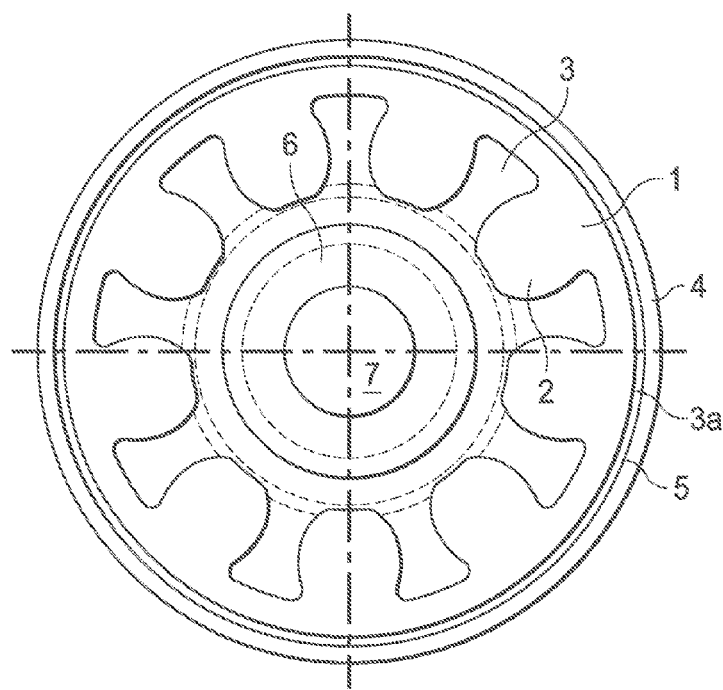
FIG. 4 shows a layer with a third example geometry.

FIG. 4 illustrates a further embodiment of a layer 1. In this case, the surface area of the webs 2 is greater than the surface area of the free spaces 3, whereby improved mechanical damping of the closing movement of the valve is realized, with a simultaneous reduction in the hydraulic damping action.

Figure 5:
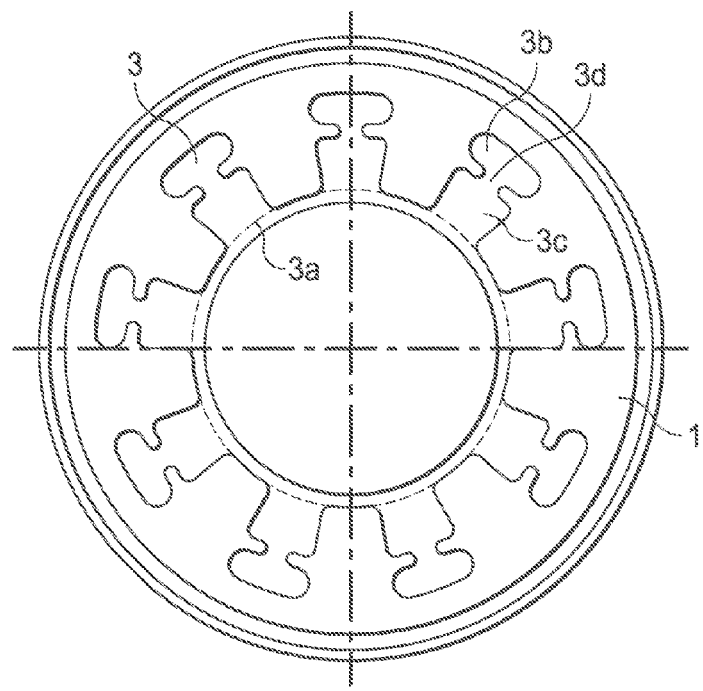
FIG. 5 shows a layer with a fourth example geometry.

FIG. 5 shows a layer 1 with free spaces 3 which form a first chamber 3b and a second chamber 3c, with a narrow duct connection 3d between the two chambers 3b and 3c. Said geometry leads to good hydraulic damping of the closing movement until the medium has been forced out of the first chambers 3b, and subsequently a uniform final closing movement.

Figure 6:
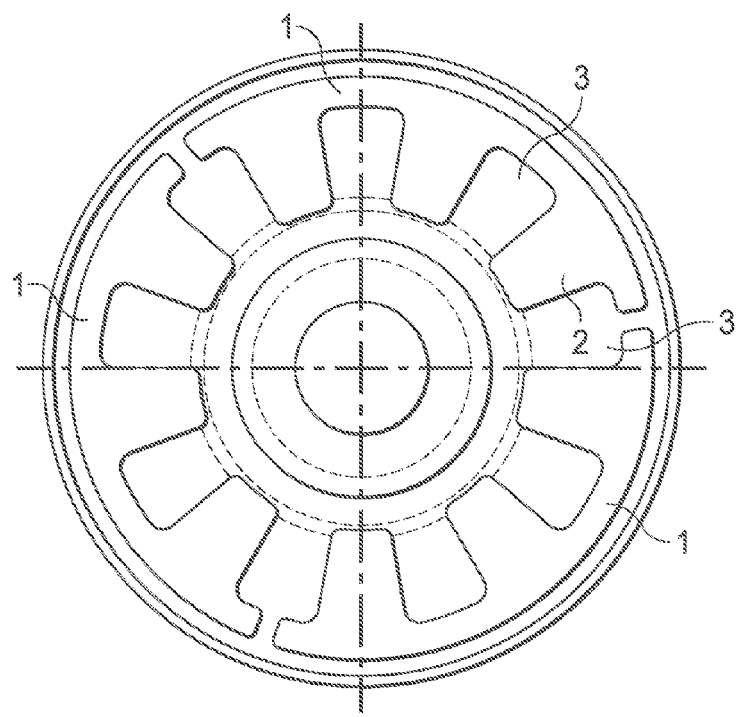
FIG. 6 shows a layer with a fifth example geometry.
Figure 7:
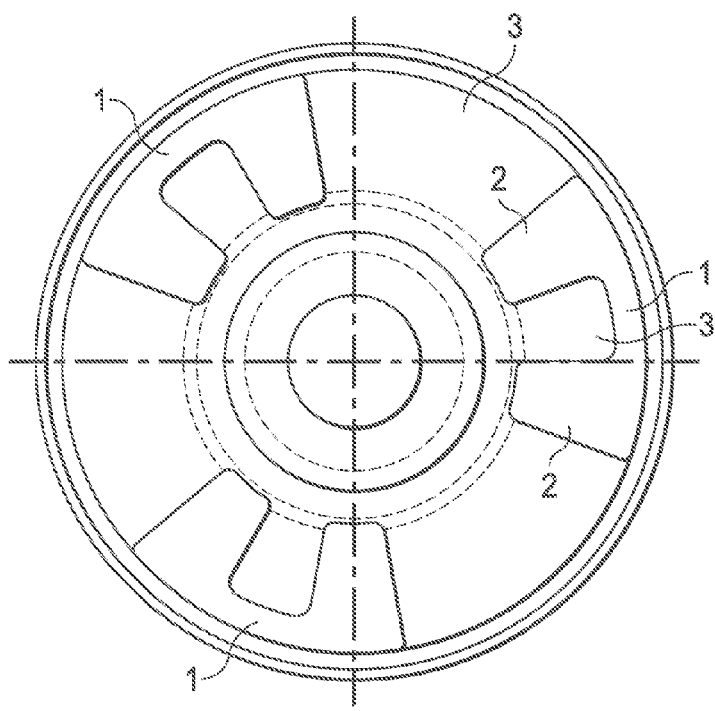
FIG. 7 shows a layer with a sixth example geometry.

FIGS. 6 and 7 show embodiments in which the layer 1 is formed not in one piece but from multiple partial layers 1. These embodiments, too, have webs 2 and free spaces 3 formed between in each case two adjacent webs 2. The free spaces 3 may be formed in the manner of the free spaces 3 in FIGS. 2 to 5, or may have any other desired form which ensures that a hydraulic, in particular pneumatic damping effect is attained during the approach movement of the support face 11 and counterpart support face 12 of the actuator and the medium can reliably be displaced as completely as possible out of the free spaces into the valve outlet.

What is claimed is:

1. An electromagnetic actuator, comprising:
an electromagnet comprising a coil that surrounds a pole core and a magnet armature,
the magnet armature configured for an approach movement toward the pole core by the electromagnet,
a stop element defining an air gap with a width between the magnet armature and the pole core at a closest approach position,
the magnet armature fixedly connected to a pin extending from the magnet armature through the pole core, and wherein
the magnet armature includes a support face facing toward the pole core, and
the pole core has a counterpart face facing toward the support face of the magnet armature,
wherein at least one of the support face and the counterpart support face includes a layer between that face and the other one of the support face and the counterpart support face, wherein the layer dampens the approach movement of the magnet armature toward the pole core, the layer comprising a plurality of webs and free spaces between adjacent pairs of webs, wherein a surface area of the webs is greater than the surface area of the free spaces, and wherein a thickness of the layer is less than a width of the air gap;
wherein the layer comprises multiple partial layers allowing radial flow across the respective face between adjacent partial layers.

2. The electromagnetic actuator of claim 1, wherein the layer is adhesively bonded or welded to at least one of the support face and the counterpart support face.

3. The electromagnetic actuator of claim 1, wherein the layer has a uniform thickness.

4. The electromagnetic actuator of claim 1, wherein the free spaces between the webs are formed such that air present in each free space builds up in at least one subregion of that free space during the approach movement of the support face and the counterpart support face, thereby pneumatically damping the approach movement.

5. The electromagnetic actuator of claim 1, wherein the layer comprises a metal, a composite material, or a plastic.

6. A valve, comprising:
a spring having a spring force,
an electromagnetic actuator comprising:
an electromagnet comprising a coil that surrounds a pole core and a magnet armature,
the magnet armature configured for an approach movement toward the pole core by the electromagnet, and a stop element defining an air gap with a width between the magnet armature and the pole core at a closest approach position, the magnet armature fixedly connected to a pin extending from the magnet armature through the pole core, the magnet armature has a support face facing toward the pole core, and the pole core has a counterpart face facing toward the support face of the magnet armature, wherein at least one of the support face and the counterpart support face includes a layer between that face and the other one of the support face and the counterpart support face, wherein the layer dampens the approach movement of the magnet armature toward the pole core, the layer comprising a plurality of webs and free spaces between adjacent pairs of webs, wherein a surface area of the webs is greater than the surface area of the free spaces, and wherein a thickness of the layer is less than a width of the air gap, wherein the layer comprises multiple partial layers allowing radial flow across the respective face between adjacent partial layers, and wherein the electromagnetic actuator provides an actuator force acting counter to the spring force, a valve member actuated by the actuator as the magnet armature moves along with the connected pin, a sealing element configured for coupling to the valve member, a sealing seat that bears against the sealing element when the valve is closed.

7. The valve of claim 6, wherein the layer is adhesively bonded or welded to at least one of the support face and the counterpart support face.

8. The valve of claim 6, wherein the layer has a uniform thickness.

9. The valve of claim 6, wherein the free spaces between the webs are formed such that air present in each free space builds up in at least one subregion of that free space during the approach movement of the support face and the counterpart support face, thereby pneumatically damping the approach movement.

10. The valve of claim 6, wherein the layer comprises a metal, a composite material, or a plastic.

* * * * *